Aug. 7, 1934.  J. M. PATTERSON  1,969,233
WHEEL MOUNTING TOOL
Filed July 19, 1933   2 Sheets-Sheet 1
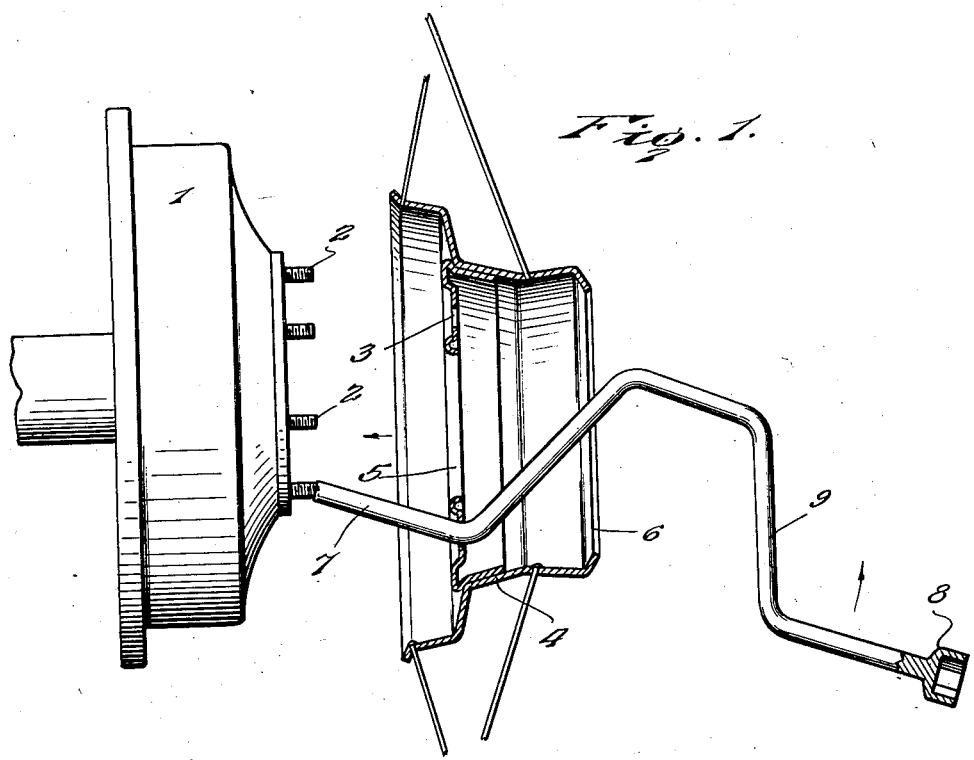
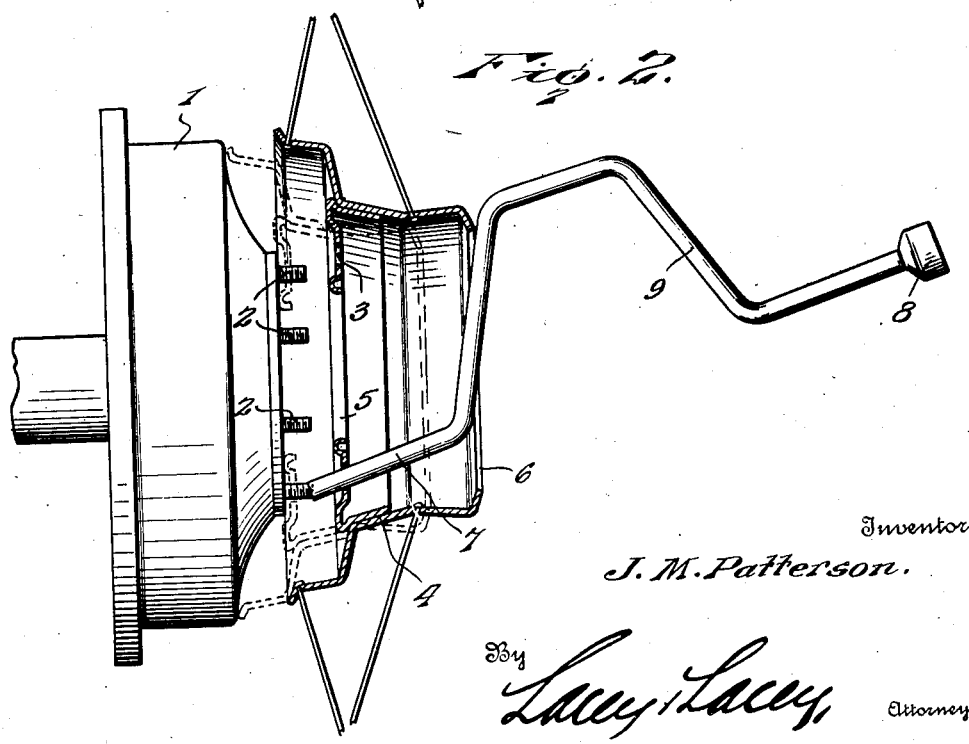
Inventor
J. M. Patterson.
By Lacey & Lacey, Attorneys

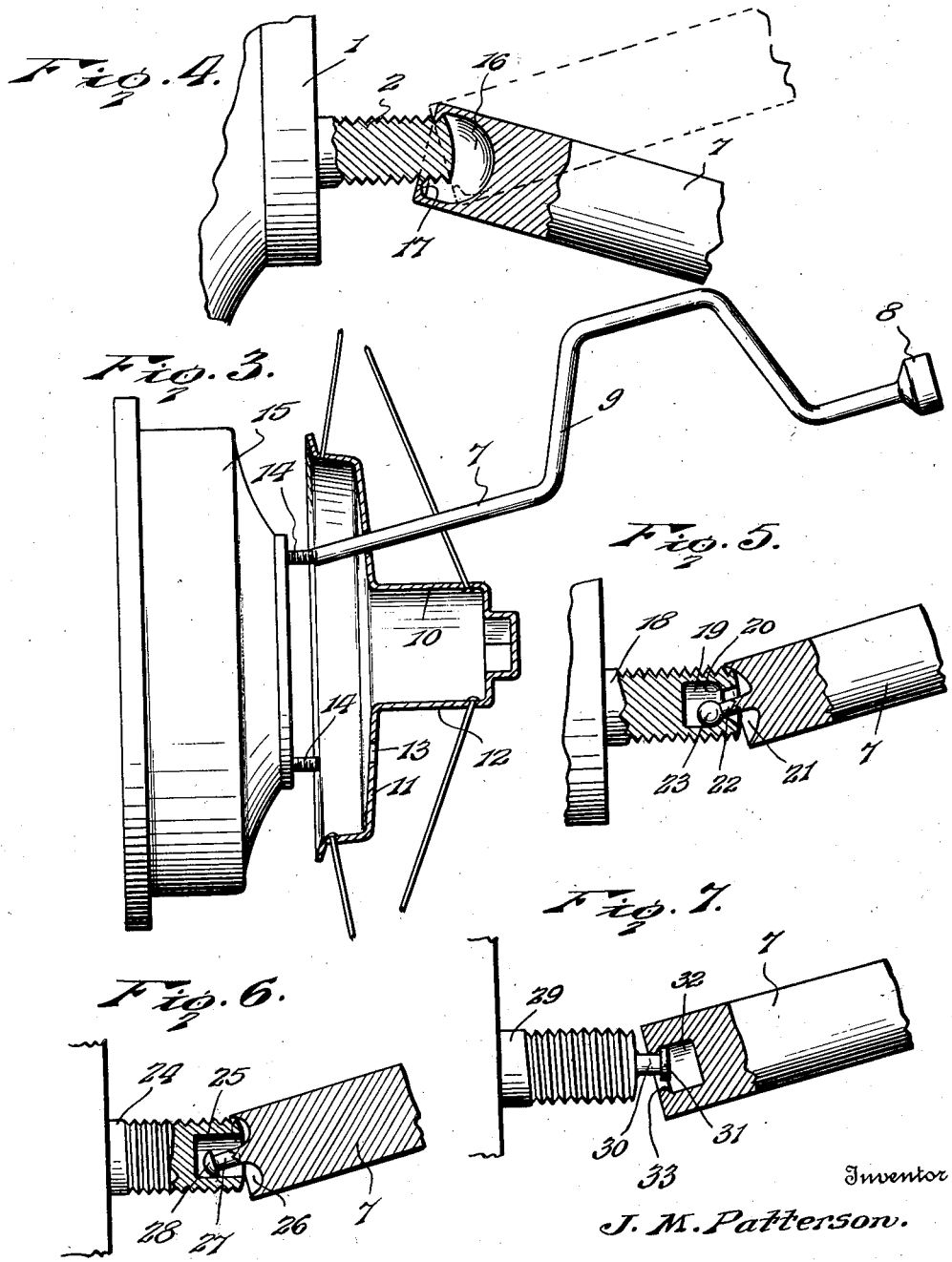

Patented Aug. 7, 1934

1,969,233

UNITED STATES PATENT OFFICE 1,969,233

WHEEL MOUNTING TOOL

James M. Patterson, San Antonio, Tex.

Application July 19, 1933, Serial No. 681,177

5 Claims. (Cl. 29—84)

This invention has for its object the provision of a simple inexpensive tool by the use of which a wheel may be easily mounted upon a hub or upon a carrying rack. Users of motor vehicles are frequently required to remove a wheel and to substitute a spare wheel or to restore the removed wheel after making some emergency repairs. Unless some tool, for assisting in the work, is available it is necessary to lift the wheel into position at the side of the hub or at the side of the carrying rack and then bodily push the wheel into place so that openings provided in the hub structure of the wheel will aline with and engage over threaded lugs or studs on the rack or the driving hub. This work is somewhat laborious and time-consuming and the present invention provides a tool of simple and inexpensive construction whereby the wheel may be very easily brought into alinement with and engaged over the lugs or studs. The invention is illustrated in the accompanying drawings and consists in certain novel features which will be hereinafter first fully described and then more particularly defined in the appended claims.

In the drawings,

Figures 1 and 2 are views partly in elevation and partly in section showing one manner of manipulating the tool to mount a wheel, Figure 3 is a similar view showing another method of mounting the wheel, Figures 4, 5, 6 and 7 are enlarged detail sections showing various constructions which may be embodied in the tool and which are within the scope of the invention.

Referring to Figures 1 and 2 more particularly, the reference numeral 1 denotes a hub structure mounted upon an axle of a vehicle and provided with threaded studs or lugs 2 on its outer side which are intended to pass through openings 3 provided in the hub member of the wheel and receive nuts which are turned home against the hole-containing member of the wheel hub to secure the wheel firmly in place. In Figures 1 and 2, a portion of the wheel is shown comprising a drum 4 from which the spokes of the wheel extend and which is of a somewhat extended formation now generally employed in automobile wheels, the openings 3 being formed in an inner diaphragm or plate 5 which extends across the hub member or drum 4 and is welded or otherwise permanently united therewith. This structure encloses the securing nuts so that sand and other foreign matter will not accumulate upon them and resist efforts to loosen them when removal of the wheel is necessary. The outer side or end of the drum 4 defines a large opening 6 and this opening is closed by a cap plate of various designs, the cap plate being omitted from the drawings in order that the invention may be more clearly illustrated.

In carrying out the present invention, there is provided a pilot rod 7 which may be the end of a nut wrench 8 which is now generally provided as regular equipment for automobiles, said wrench being formed on the end of a bar which is offset, as shown at 9, between its ends to form a crank whereby the rod may be rotated when the wrench 8 is in engagement with a nut.

In Figure 3 there is illustrated another form of wheel hub 10 which is of a simpler form than that illustrated in Figures 1 and 2 and includes a diaphragm or plate 11 extending from the inner end of a sleeve-like member 12 and having openings 13 formed therein to receive the threaded lugs or studs 14 on the hub 15 which is carried upon the axle of the vehicle. The tool may be used with either form of hub, and when employed in connection with the form shown in Figures 1 and 2 the pilot rod is preferably inserted through an opening 3, which is below the center of the wheel hub, and engaged over a lower lug or stud 2, as shown in Figure 1, it being noted that the end of the pilot rod is inserted upwardly through the opening in the wheel hub and that the crank 9 will be disposed at the outer side of the hub. The outer end or wrench end of the rod is now grasped and lifted, as indicated by the arrow in Figure 1, the tool being grasped by one hand while the other hand of the user is placed upon the wheel so as to steady it as it is lifted, and prevent it swinging about the rod as a center. As the rod swings upwardly, the wheel will, of course, be lifted, as shown in Figure 2, and the crank portion of the rod will be brought against the upper portion of the hub, at the opening 6, so that it may be used to push the wheel toward the hub 1 and thereby aid in mounting the wheel. As the outer end of the rod is lifted above a horizontal position, the rod assumes the inclined position shown in Figure 2 and the weight of the wheel then tends to cause it to slide toward the lugs and off the pilot rod onto the lugs so that the wheel may be very easily and rapidly fitted in place. When the hub is of the form shown in Figure 3 it is easier to insert the pilot rod through an opening in the upper portion of the hub and engage its end over an upper stud or lug, inasmuch as the space around the openings is clear and it will not be necessary for the operator to bend his body in order to obtain a view of the opening in which the tool is to be inserted. The operation or manipulation of the tool is exactly the same, the wheel sliding down off the pilot rod onto the lugs as the tool is swung above the horizontal position.

In order to engage the end of the pilot rod over the end of the wheel-securing lug or stud, the end of the rod is formed with a socket 16 which is of sufficient diameter to readily fit over the end of the lug without binding upon any of the threads thereon and mutilating the same. In the form shown in Figure 4, a retaining flange 17 is formed on the wall of the socket 16 at the mouth of the same, the outer surface of the flange being disposed flush with the outer end of the rod and the inner surface thereof inclined in the direction of the free edge of the flange, as shown. This flange is adapted to engage a thread of the securing stud and thereby not only resist any tendency of the pilot rod to pull off the lug before the wheel is mounted but also acts as a pivot for the rod when said rod is tilted to direct the wheel onto the studs. The openings in the wheel hub are ordinarily appreciably larger than the threaded lugs or stud which enter them and the securing nuts are made large enough to fully cover the openings and firmly bind the wheel in place. When the pilot rod is engaged over the end of the stud, the flange 17 will not immediately engage the thread of the stud but as the tool takes up the weight of the wheel it will drop into engagement with the thread and consequently will resist any withdrawing movement. As the tool swings upwardly it will rock upon the end of the stud and as it assumes the position indicated by dotted lines in Figure 4, the wheel will slide downwardly from the pilot rod onto the stud, and it will be noted that the end of the rod will extend over the end of the lug so that the threads of the lug will be protected against breaking or stripping from impact of the wheel.

The form of stud shown in Figure 4 is the one most generally used in automobile construction but there may be lugs such as shown at 18 in Figure 5 in which a socket 19 is formed in the end of the stud or lug, an internal flange 20 being formed around the mouth of the socket. For equipment upon automobiles having the stud 18, the pilot rod 7 is formed with a concave seat 21 in its end, and from the center of said seat a stem 22 projects axially from the rod, the stem being provided with a spherical head 23 at its outer end. The diameter of the head 23 is less than the diameter of the opening defined by the flange 20 so that the head of the stem may readily pass into the socket 19 and engage behind the flange, as shown in Figure 5, so that the engagement of the head and the flange will resist withdrawing movement of the pilot rod and the rod, consequently, will not easily slide from the lug. The tool is operated in the manner previously described, and as it is swung upwardly the concave seat 21 will ride over the end of the lug so the upper portion of said seat will project over the threads, as clearly shown in Figure 5, so that when the wheel slides from the pilot rod onto the lugs it will not crush the threads of the lug.

In Figure 6 is shown a lug 24 which has a socket 25 formed in its outer end but is without any engaging flange at the mouth of the socket. The pilot rod 7 which is used in connection with this lug is provided with the concave seat 26, similar to the seat 21, just described, and the stem 27 extends axially from said seat. The outer end of the stem is provided with a head 28 which is of semi-spherical form and will readily enter the socket 25. When the tool is inserted through the openings in the wheel hub it is in an inclined position, as clearly shown in the drawings, and with the form shown in Figure 6, a withdrawing movement of the tool will be resisted by the edge of the head 28 impinging against the wall of the socket 25 and causing the tool to tilt so that the head will catch upon the corner at the mouth of the socket and resist dislodgment. As, with the form shown in Figure 5, when the pilot rod shown in Figure 6 is rocked upwardly the concave seat will rock over the threads of the stud so as to protect the same from any damaging impact of the wheel and the head 28, like the head 23, permits the tool to be easily rocked in the socket to lift the wheel into place.

In Figure 7 is shown a stud 29 having a stem 30 projecting axially from its outer end, said stem being provided with a circular disk-like head 31. The pilot rod is formed with a socket 32 having a flange 33 on its wall at its mouth which, when the socket is engaged around the stem, will fit behind the head and resist withdrawing movement of the tool. While the end of the tool, in this form, will not fit over the threads of the lug, the diameter of the tool is sufficiently greater than the diameter of the lug to prevent the wheel sliding squarely against the threads to bend or strip the same.

In all forms of the invention, there is provided a pilot rod which may be very easily inserted through an opening in the hub member of the wheel to engage over the wheel-securing lugs or studs of the hub on the axle or on the side of a carrying rack. The tool of my invention may be very readily formed on the end of the wrench, now generally provided as regular automobile equipment, and may be produced at an exceedingly low cost. The pilot rod need not be very heavy but will have sufficient strength to readily support the wheel and guide it onto the threaded lugs or studs. By the use of this tool a demounted wheel may be mounted within a very short period of time so that the motorist will not be subjected to excessive inconvenience in his use of the vehicle or delayed upon any trip.

Having thus described the invention, I claim:

1. A wheel-mounting tool consisting of a pilot rod insertable through an opening in the wheel hub member and adapted to engage a threaded securing stud on an axle-carried hub to direct the wheel onto the studs, the pilot rod being provided at its end with a socket and a single inwardly extending retaining flange overhanging the socket and adapted to engage one of the threads on the adjacent stud to resist disengagement from said stud.

2. A wheel-mounting tool comprising a pilot rod having a socket in its end to engage over a wheel-securing stud and provided on the wall of said socket at the mouth thereof with a single inwardly extending retaining flange.

3. A wheel-mounting tool comprising a pilot rod having a cranked portion and provided at one end with a socket for the reception of the end of a threaded wheel-securing stud, said socket defining an inwardly extending flange adapted to engage a thread on the stud and act as a pivot for the rod when said rod is tilted on the stud to direct a wheel onto said stud.

4. A wheel-mounting tool comprising a pilot rod having a socket in its end adapted to receive a threaded wheel-securing stud, the mouth of the socket being provided with a terminal inwardly extending retaining flange adapted to engage a thread on the stud and act as a pivot for the rod when said rod is tilted on the stud to direct a wheel onto said stud.

5. A wheel-mounting tool comprising a pilot rod having a socket in its end adapted to receive the adjacent end of a threaded wheel-securing stud, the mouth of the socket being provided with an inwardly extending retaining flange, the outer face of which is flush with the end of the rod and the inner surface thereof tapering toward the free edge of said flange, whereby when the tool is positioned over a securing stud the flange will engage a thread on the stud and act as a pivot for the rod when said rod is tilted to direct a wheel onto the stud.

JAMES M. PATTERSON. [L. S.]